United States Patent
Baumstark

[11] 3,813,805
[45] June 4, 1974

[54] AUTOMATIC FISHING DEVICE
[76] Inventor: Leopold Baumstark, 37980 Vineland Ave., Beaumont, Calif. 92223
[22] Filed: May 1, 1972
[21] Appl. No.: 249,038

[52] U.S. Cl. .................................................. 43/15
[51] Int. Cl............................................ A01k 97/00
[58] Field of Search............................. 43/15, 16, 19

[56] References Cited
UNITED STATES PATENTS
3,055,135   9/1962   Lewis, Jr................................. 43/15
3,104,485   9/1963   Wallingford ............................ 43/15
FOREIGN PATENTS OR APPLICATIONS
692,647   8/1965   Italy........................................ 43/15

*Primary Examiner*—Russell R. Kinsey
*Assistant Examiner*—Daniel J. Leach

[57] ABSTRACT

A mechanism for abruptly jerking a fishing rod in response to deflection of the rod caused by a fish biting on a line attached to the rod, so that a hook attached to the line firmly engages the biting fish. The mechanism includes a lever arm secured to the rod and a housing pivotally attached to the lever arm. A member is slidably disposed in the housing and is biased toward the lever arm by a spring. A trigger on the housing holds the member in cocked position at an angle to the lever arm but when a fish pulls on the line the trigger releases the member which engages the lever arm to pivot relative thereto into alignment with the lever arm and jerks the lever arm and the fishing rod to cause the hook to be embedded in the fish's mouth.

13 Claims, 4 Drawing Figures

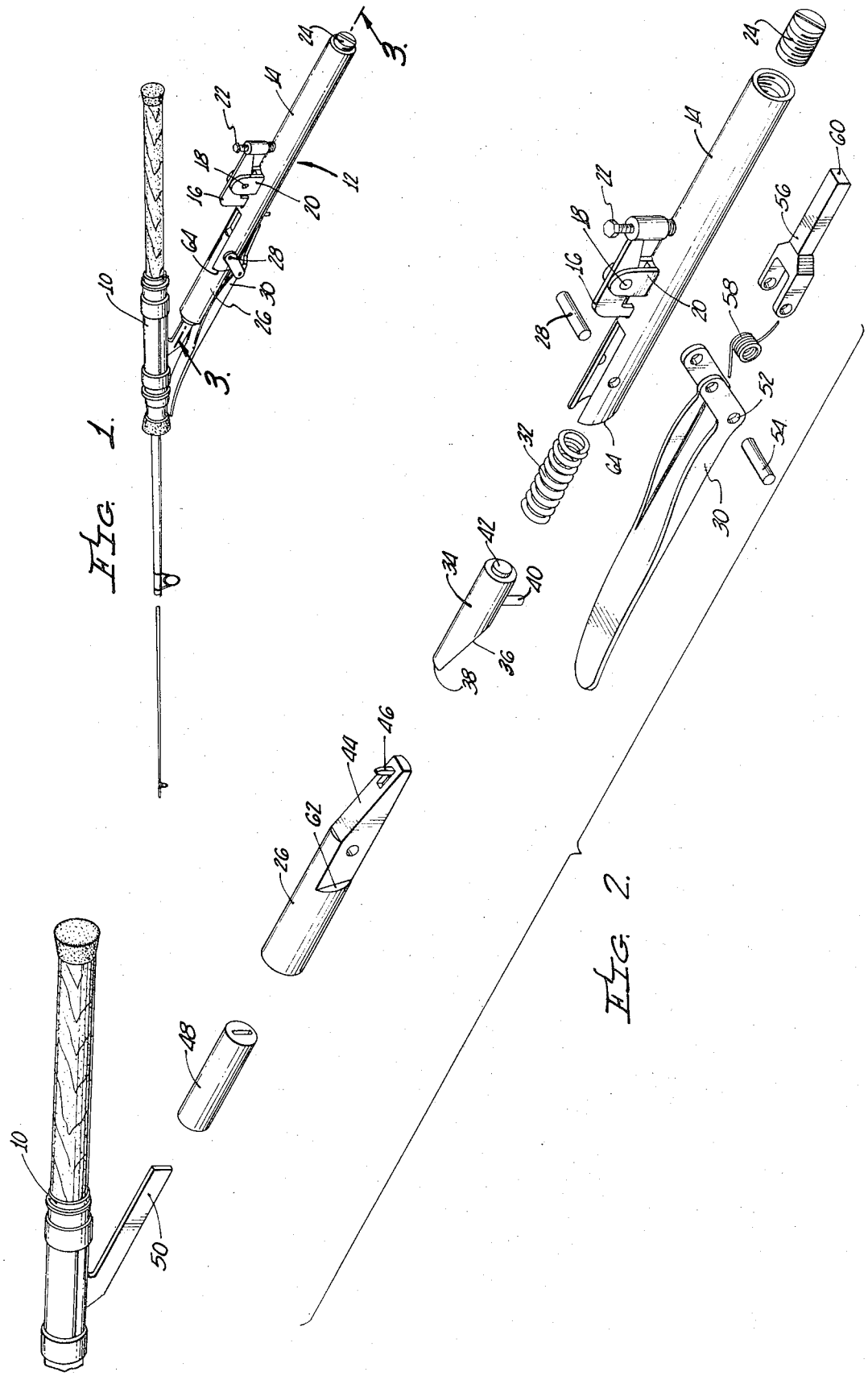

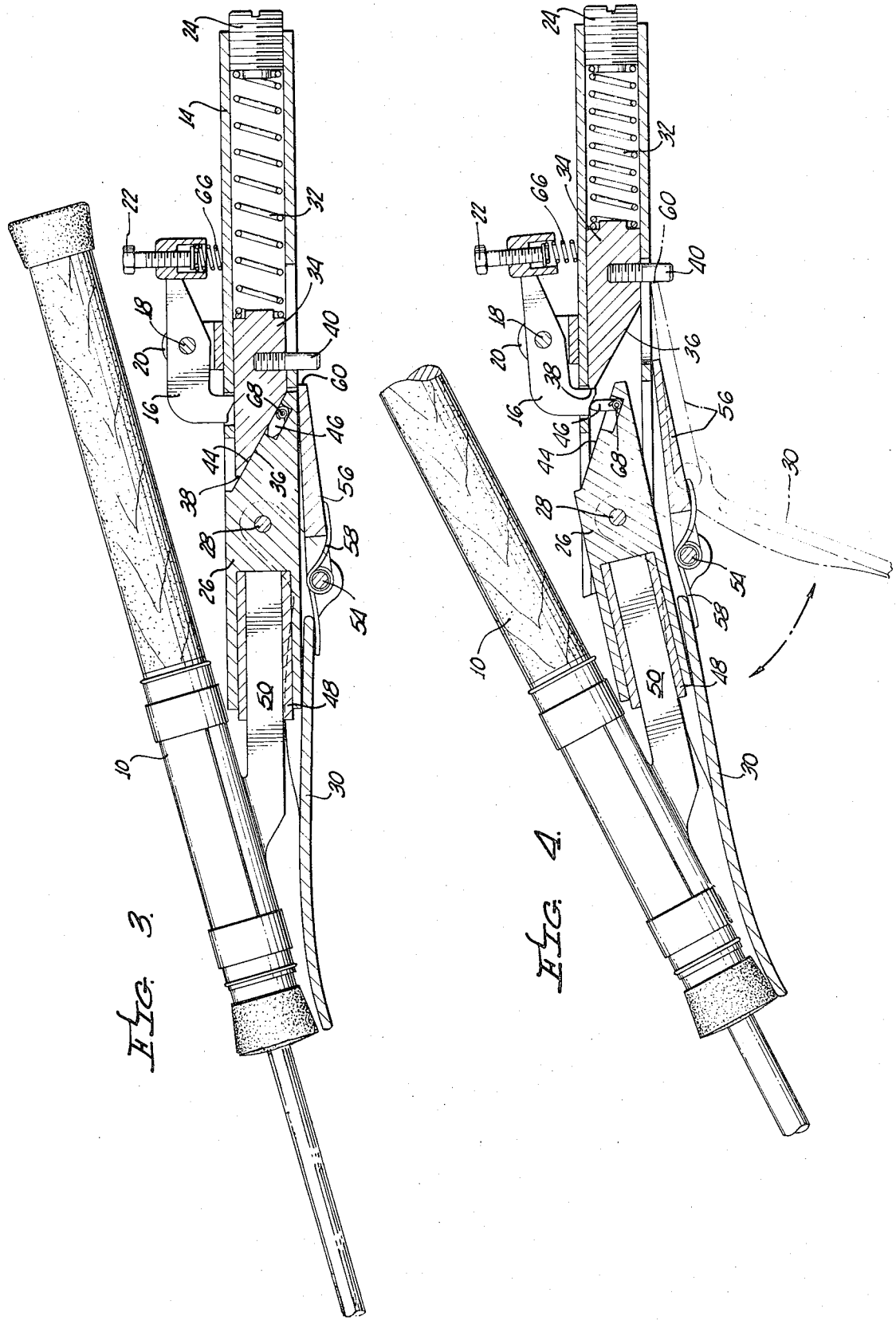

_3,813,805_

AUTOMATIC FISHING DEVICE

BACKGROUND OF THE INVENTION

A variety of mechanisms have previously been developed for the purpose of automatically jerking and thereby engaging a fishing hook in the mouth of the fish in response to a pull on a fishing line caused by the fish biting on the hook. However, these mechanisms typically utilize a spring to directly deflect the fishing rod, the spring being triggered by motion of the fishing line. Such direct spring drives are not adapted to produce the short impulsive jerk necessary to properly engage the fishing hook.

SUMMARY OF THE INVENTION

The present invention, on the other hand, utilizes an intermediate member which is rapidly accelerated by a spring and engages a lever which is attached to the fishing rod to impart a short impulsive movement thereto. This movement occurs rapidly, in response to a fish bite, so that the fish does not have an opportunity to release the bait from the hook and avoid the rapidly moving hook. Furthermore, the intermediate member allows the total movement of the fishing rod to be accurately predetermined so that the rod moves through a predetermined distance each time it is triggered. The present invention also includes means for an infinite adjustment of the amount of force required to trigger the mechanism so that it may be adjusted during use for various water conditions and fish sizes. Likewise, the present invention includes means for an infinite adjustment of the cocked tension of the main drive spring, so that the force of the impulse may be varied for a variety of fishing conditions. The use of an intermediate member in the present invention allows a relatively simple, highly reliable construction, easy cocking of the mechanism, and accurate adjustment of the trigger.

These and other advantages of this invention are best understood by reference to the drawings in which:

FIG. 1 shows an overall perspective view of the mechanism attached to a fishing rod;

FIG. 2 shows an exploded view in perspective of the mechanism of FIG. 1;

FIG. 3 shows a sectional view through line 3—3 of FIG. 1 with the mechanism in the uncocked position; and FIG. 4 is a sectional view identical to that of FIG. 3 but with the mechanism cocked.

DESCRIPTION OF THE PREFERRED EMBODIMENT

Referring first to FIG. 1, the mechanism used to impulsively jerk a fishing rod 10 is shown generally at 12. This mechanism in the preferred embodiment includes a base or housing in the form of a generally cylindrical sleeve 14 which is adapted to be mounted on a boat or in the ground by means of any well-known clamp. The particular clamp which is used is not shown in the drawings, and may take various forms so long as it mounts the sleeve 14 to hold the rod 10 at an angle appropriate for catching fish. The mechanism 12 includes a trigger 16 which is rotatably mounted by means of a pin 18 to a pair of upstanding tabs 20 which are firmly attached to the cylindrical sleeve 14. One end of the trigger 16 has a tapped hole through which a trigger adjusting screw 22 is threaded. Similarly, one end of the cylindrical sleeve 14 is threaded to receive a spring-adjusting threaded plug 24.

A lever 26 is rigidly attached to the fishing rod 10, as by the well known mechanism used to support the fishing reel. This lever 26 is rotatably mounted to the cylindrical sleeve 14 by means of a pin 28 which passes through holes which are bored in the cylindrical sleeve 14 and the lever 26. This pin 28 likewise rotatably mounts a cocking arm 30.

Referring now to the exploded view of FIG. 2, the interrelationship of the elements of this invention will be described. Mounted within the cylindrical sleeve 14 and abutted against the spring-adjusting threaded plug 24 is a main drive spring 32. One end of this spring 32 is in contact with an intermediate member 34 which also lies within the cylindrical sleeve 14. This intermediate member 34 is free to reciprocate within the sleeve 14, and, in the preferred embodiment, is in the form of a cylinder, one end of which is cut to form a wedge camming surface 36. The forward end of the intermediate member 34 is preferably formed along a plane at a right angle to the axis of the member 34 so that a surface 38 is formed for engagement by the trigger 16. The intermediate member 34 additionally carries a pin 40 which is rigidly attached to the member 34 and which protrudes through a slot in the cylindrical sleeve 14 so that the intermediate member 34 may be forced against the spring 32 by means which operate outside of the cylindrical sleeve 14. The end of the intermediate member 34 which engages the spring 32 is formed with a spring centering surface such as the protruding dowel 42 around which the spring 32 will seat.

The wedge camming surface 36 of the intermediate member 34 is designed to engage a second wedge camming surface 44 which is formed on one end of the lever 26. The end of the lever 26 which includes the surface 44, fits within one end of the cylindrical sleeve 14 and is of a size which allows the lever 26 to rotate about the pin 28 through a small arc. The camming surface 44 is broken by a trigger release pin 46 which is rotatably mounted near the end of the lever 26. This pin 46 is used to release the trigger 16. A slotted sleeve 48 is firmly attached within the other end of the lever 26 and is adapted to receive an arm 50 which is rigidly attached to the rod 10. It has been found advantageous to loosely fit the arm 50 within the slot of the slotted sleeve 48 so that the rod 10 may be removed from the mechanism for baiting hooks and removing fish from the fishing line.

Referring again to FIG. 2, the cocking arm 30, which is attached to the pin 28 to rotate about the cylindrical sleeve 14, is in the form of an L-shaped lever arm with holes 52 bored at the knee of the L. These holes 52 carry a pin 54 to rotatably mount a cocking bar 56. A spring 58 is wound around the pin 54 and engages both the arm 30 and the bar 56 so that as the lever arm 30 is lifted away from the cylindrical sleeve 14, to rotate about the pin 28, the bar 56 is biased to contact the lower portion of the sleeve 14 by spring 58, and will rotate about the pin 54 so that it slides along the bottom of the sleeve 14 toward the plug 24. As the bar 56 slides along the lower portion of the cylindrical sleeve 14, the end 60 engages the pin 40 of the intermediate member 34 to drive the member 34 against the spring 32, thereby cocking the mechanism.

The operation of this device is better described in reference to FIGS. 3 and 4, showing the mechanism before and after cocking, respectively. Referring first to FIG. 3, when the device is in its uncocked configuration, the spring 32 bears against the threaded plug 24 and the intermediate member 34. The camming surface 36 of the intermediate member in turn bears against the surface 44 of the lever 26 forcing the lever 26 to rotate clockwise around the pin 28 to its extreme clockwise position. This position is defined by the engagement of a surface 62 on the lever 26 with a frontal surface 64 on the sleeve 14, as shown in FIG. 2. As can be seen from FIG. 3, the extreme clockwise position of the lever 26 aligns the lever 26 with the sleeve 14 so that the arm 50 which is attached to the rod 10 is in alignment with the sleeve 14.

Referring now to FIG. 4, showing the mechanism in the cocked configuration, it can be seen that a rotation of the cocking arm 30 in a counter-clockwise direction around the pin 28 will cause the pin 54 to rotate in a counter-clockwise direction around the pin 28. The spring 58 is utilized to maintain the end 60 of the cocking bar 56 adjacent the bottom of the sleeve 14 as the pin 54 rotates about the pin 28. The end 60 of the bar 56, therefore, moves transversely to the right and engages the pin 40 which is attached to the intermediate member 34. Further motion of the cocking arm 30 about the pin 28 forces the intermediate member 34 toward the plug 24 against the bias of the spring 32. When the intermediate member 34 has been moved a sufficient distance, the end 38 of the intermediate member 34 will clear the edge of the trigger 16 and a spring 66 which is biased against the surface of the sleeve 14 and the bottom of the trigger adjusting screw 22 will force the trigger 16 to rotate about the pin 18 so that the edge of the trigger 16 will lie in the path of the surface 38 of the intermediate member 34. The cocking arm 30 may now be released and, under the action of the spring 58, will return to the position shown in full lines in FIG. 4. The intermediate member 34 is maintained in the cocked position by the trigger 16. With the mechanism in this position, the lever 26 is free to rotate between the position shown in FIG. 3 and a second extreme position shown in FIG. 4, in which the trigger pin 46 engages the bottom of the trigger 16. It will be noted that the trigger pin 46 is biased to rotate in a clockwise direction by a spring 68 and rotates to a vertical position as shown in FIG. 4 when released. When in this position, the trigger pin 46 bears directly on the bottom of the trigger mechanism 16 and supports the weight of the rod 10 rotating about the pin 28. A pull on the rod 10, as by the fish biting on a line attached to the rod, will rotate the rod 10 and its attached lever 26 about the pin 28 thereby forcing the end of the trigger 16 vertically upward and rotating the trigger 16 about the pin 18 and against the bias of the spring 66, releasing the intermediate member 34. The member 34 is then thrown forward by the spring 32 to engage the lever 26. This engagement forces the trigger pin 46 counter-clockwise against the bias of the spring 68 so that it lies within a recess as shown in FIG. 3, and it does not interfere with the interaction of the camming surfaces 36 and 44. As the intermediate member 34 is moved by the spring 32 transversely to the left in FIG. 4, the wedging action of the intermediate member 34 with the lever 26 forces the lever 26 to rotate in a clockwise direction about the pin 28 carrying with it the rod 10. This motion of the rod 10 is in a direction opposite the force of the pull on the fishing line caused by the fish biting. The abrupt impulsive action causes the fish hook attached to the rod 10 to firmly engage or "set" itself in the mouth of the biting fish.

It can be seen from FIGS. 3 and 4 that adjustment of the plug 24 by screwing it into and out of the sleeve 14 allows an adjustment of the compression of the spring 32 so that the force of the impulsive action caused by triggering of the mechanism may be adjusted. Similarly, advancement of the screw 22 through the trigger 16 will change the compressional bias of the spring 66 so that the amount of force required for the trigger pin 46 to lift the end of the trigger 16 may be adjusted. Therefore, both the force of the fish bite required to trigger the mechanism and the jerk resulting from the triggering are adjustable in the present invention. It should be noted that in the preferred embodiment, when the mechanism is cocked, as shown in FIG. 4, the weight of the fishing rod 10 will maintain the lever 26 rotated about the pin 28 so that the trigger pin 46 engages the trigger 16.

What is claimed is:

1. A mechanism for impulsively jerking a fishing rod in response to motion of said fishing rod caused by a fish biting on a hook attached to a line on said rod comprising:

a housing;

a lever arm pivotally attached to said housing and pivotally movable from a cocked position to a released position;

means for connecting said rod to said lever arm to cause said rod to pivot in response to pivotal movement of said lever arm to said released position;

an intermediate member mounted in said housing for movement between a cocked position remote from said lever arm and a released position in contact with said lever arm;

means on said intermediate member engaging said lever arm when said intermediate member moves to said released position and forcing said lever arm from its cocked position to its released position;

a spring in said housing biasing said intermediate member for movement with respect to said housing toward said released position;

a trigger mounted on said housing for movement with respect to said housing, said trigger having means movable between a cocked position engaging and holding said intermediate member in said trigger's cocked position and a released position releasing said intermediate member for movement to said intermediate member's released position under the bias of said spring to impulsively jerk said lever arm and said rod to set said fish hook; and means for moving said trigger to said released position in response to pulling of said line on said rod.

2. A mechanism as defined in claim 1 wherein:
   said housing is a cylindrical slotted sleeve;
   said intermediate member reciprocates within said sleeve; and
   said lever arm is attached to said sleeve to pivot within said slot.

3. A mechanism as defined in claim 2 wherein said spring is mounted within said cylindrical sleeve, said mechanism additionally comprising:

a spring adjusting member, adjustably attached to said sleeve, said spring adjusting member supporting one end of said spring.

4. A mechanism as defined in claim 3 wherein said spring adjusting member is a plug threaded to engage threads within said cylindrical sleeve.

5. A mechanism as defined in claim 1 wherein said trigger is adjustable so that the force of said motion of said rod required to move said trigger is adjustable.

6. A mechanism as defined in claim 5 wherein said trigger is biased toward said position intermediate said intermediate member and said lever arm by a spring, the force of said spring bias being adjustable to adjust the required trigger force.

7. A mechanism for catching fish, comprising:
a housing;
a fishing rod attached to said housing to pivot relative to said housing and adapted to have a line thereon;
a lever arm pivotally attached to said housing to pivot relative to said housing together with said rod;
a spring in said housing having one end attached to said housing;
a member mounted in said housing and adapted to move relative to said housing from a cocked position to a released position, said member being engaged by said spring and biased by said spring toward said lever arm, and directly engaging said lever arm at said released position to pivot said lever arm on said housing and thereby pivot said rod; and
a trigger maintaining the bias in said spring and maintaining said member in said cocked position, said trigger being attached to said housing to release in response to motion of said rod relative to said housing caused by pulling on said line permitting said member under the bias of said spring to impulsively engage said lever arm, said impulsive engagement jerking said fishing rod about said pivot to pull said line and catch said fish.

8. A mechanism as defined in claim 7 wherein said member biased by said spring has a wedge camming surface, said lever arm has a wedge camming surface, and engagement of said member and said lever arm engages said camming surfaces to wedge said lever arm and said fishing rod about said pivot.

9. A mechanism as defined in claim 8 wherein the force of said spring bias is adjustable, so that the force of said wedged pivoting of said fishing rod and lever arm is adjustable.

10. A mechanism as defined in claim 7 wherein the motion of said rod required to release said trigger is adjustable.

11. A mechanism for catching fish by means of a fishing line attached to said mechanism comprising:
a housing;
a wedge mounted in said housing for reciprocation between a cocked position and a released position relative to said housing;
a lever arm mounted on said housing to pivot relative to said housing from a cocked position to a released position, the path of said pivotal motion lying at least partially within the path of said reciprocation of said wedge;
said line being attached to a fishing rod connected to said lever arm, said lever arm being pivoted from said cocked position to said released position in response to a pull on the line; and
means for reciprocating said wedge toward said lever arm in response to pulling motion of said fishing line, so that said wedge contacts said lever arm causing said lever arm to pivot to said released position to pull said fishing line on said rod.

12. A mechanism as defined in claim 11 wherein said means for reciprocating said wedge comprises:
a spring, biasing said wedge for reciprocation toward one of said two extremes; and
a trigger, maintaining the bias in said spring, said trigger being released by motion of said fishing line.

13. A mechanism as defined in claim 12 wherein the bias of said spring is adjustable, and the motion of said fishing line required to release said trigger is independently adjustable.

* * * * *